US005736678A

United States Patent [19]

Kobayashi

[11] Patent Number: 5,736,678

[45] Date of Patent: Apr. 7, 1998

[54] TERMINAL FOR HIGH-VOLTAGE RESISTANT ELECTRICAL WIRE

[75] Inventor: Yoshinao Kobayashi, Yokkaichi, Japan

[73] Assignee: Sumitomo Wiring Systems, Ltd., Japan

[21] Appl. No.: 354,506

[22] Filed: Dec. 12, 1994

[30] Foreign Application Priority Data

Dec. 10, 1993 [JP] Japan .............................. 5-066007 U

[51] Int. Cl.[6] .............................. H02G 3/06; H01R 4/18

[52] U.S. Cl. .................... 174/84 C; 174/94 R; 174/176; 439/125

[58] Field of Search .............................. 174/74 R, 94 R, 174/84 C, 176, 35 SM, 17 CT, 59, 60, 267; 439/125, 865, 866, 867, 877, 878, 879

[56] References Cited

U.S. PATENT DOCUMENTS

| | | | |
|---|---|---|---|
| 3,597,723 | 8/1971 | Schmidt et al. | 339/26 |
| 4,032,215 | 6/1977 | Jarmofsky et al. | 339/258 R |
| 4,209,221 | 6/1980 | Chupak et al. | 339/223 |
| 4,863,391 | 9/1989 | Mochizuki | 439/125 |
| 4,880,389 | 11/1989 | Mochizuki et al. | 439/125 |
| 5,281,760 | 1/1994 | Kikuchi et al. | 174/74 R |

FOREIGN PATENT DOCUMENTS

| | | | |
|---|---|---|---|
| 27981 | 4/1980 | Japan | H01R 4/18 |

*Primary Examiner*—Kristine L. Kincaid
*Assistant Examiner*—Chau N. Nguyen
*Attorney, Agent, or Firm*—Jordan B. Bierman; Bierman, Muserlian and Lucas LLP

[57] ABSTRACT

In a terminal for high-voltage resistant electrical wire, an intermediate part is provided with two opposed lateral walls separated by a base. The intermediate part is located between a barrel, to which the end portion of a high-voltage resistant wire is caulked, and a connecting portion. A stopper is formed by cutting and lifting the base of the intermediate part and contacts the fold-back portion of the high-voltage resistant electrical wire at its end section. A support consisting of a plate-like portion is also provided, the plate-like portion protruding from the upper end of at least one of the opposed lateral walls towards the other lateral wall and contacting a stopper at a plane thereof facing the connecting portion.

14 Claims, 5 Drawing Sheets

TERMINAL FOR HIGH-VOLTAGE RESISTANT ELECTRICAL WIRE

DESCRIPTION

The present invention relates to a terminal for an electrical wire, resistant to a high voltage, and more particularly a terminal connecting the high-voltage resistant wire to the parts aimed at high-voltage use, such as ignition plugs, ignition coils, distributors etc., used for an internal-combustion engine e.g. for a motor vehicle.

BACKGROUND OF THE INVENTION

FIG. 10 shows an example of high voltage electrical wire in which the high-voltage resistant electrical wire 1 forms a highly resistant coiled conductor 2, by winding on an insulation core with a resistant wire such as nickel-chrome wire etc. and in which the conductor 2 is coated with an insulation coating 3 consisting of thick rubber or the like.

As another kind of high voltage electrical wire, there exists also fibers coated with carbon paints.

FIG. 11 shows an example of the known terminals, disclosed by Japanese utility model examined publication No. S55 - 27981, which is used for connecting aforementioned high-voltage resistant electrical wire 1 to an electrode such as an ignition plug, etc.

In this high-voltage resistant electrical wire 1, the insulation coating 3 is peeled off at a specified length from its one end, thus exposing the conductor 2, and this exposed conductor 2 is folded back at the end section of the insulation coating 3 and extended along the outer surface thereof, thus forming a fold back potion *2a*.

The above-mentioned end section of high-voltage resistant electrical wire forming the fold-back portion *2a* is adhesively pressed to the barrel *6a, 6b* of terminal 5. The part of said fold-back portion *2a* extending along the end section of the insulation coating 3 is contacted with a stopper 7 which is formed by cutting and lifting the base *5a* of the terminal 5. In this terminal 3, due to the fact that the fold-back portion *2a* is in contact with the stopper 7, as described above, the fold-back portion *2a* is protected and a better contact is established between the conductor 2 and the terminal 5.

However, according to the aforementioned known terminal 5, the stopper 7 is formed by cutting and lifting the base *5a* of the terminal 5. This incurs an insufficient solidity of the foundation *7a* of the cut and lifted part. It may happen that the stopper 7 breaks or falls on the connecting portion 8. For this reason, such kind of terminal 5 has to be made of a hard material such as SUS 430 and has to have a sufficient thickness, but this practice renders its formability and electric conductivity less appropriate. Further, if said stopper 7 is made elastic and the fold-back portion *2a* can be contacted elastically, the contact between the conductor 2 and the terminal 5 may be improved.

However, when a hard and thick material is used, as described above, the stopper 7 cannot be made elastic. Furthermore, according to the known terminal 5, the cut and lifted portion has less solidity and the dimension of the stopper 7 is thus limited. Consequently the conductor 2 may jut out from the stopper 7 at the time of contact and cause burning damage.

SUMMARY OF THE INVENTION

The present invention is aimed at solving the aforementioned problem relating to the known terminals used for high-voltage resistant electrical wires. The structure according to the invention is such that the stopper is prevented from breaking or falling, such that a thin or elastic material may be used as terminal material, and whereby the formability and the electrical conductivity are improved. Further, the present invention intends to improve contactability with the high-voltage resistant electrical wire by conferring elasticity to the stopper. Furthermore, the present invention aims at setting the dimension of the stopper sufficiently large, so that the conductor does not jut out therefrom.

Therefore, the present invention has the objective to provide a terminal for a high-voltage resistant electrical wire, comprising:

a barrel suitable for fixing an end section of said wire, said end section including a fold-back portion of the exposed part of the conductor contained in said wire, a connecting portion suitable for receiving an electrode from exterior, and an intermediate part extending therebetween, said part being provided with the lateral walls opposingly facing with the space of the base of said part therebetween and open at the upperside thereof, said part further comprising a stopper to be contacted with said fold-back portion of the conductor, characterised in that, the intermediate part further comprises a fall preventing portion of the stopper consisting of at least one plate-like portion, said plate-like portion protruding from the upper end of at least one of the opposingly facing lateral walls of the intermediate part towards the other lateral wall thereof, so as to form, by sectional view, a linear, bent or coiled shape suitable for supporting the stopper, and whereby said fall preventing portion is contacted to said stopper by the side of the connecting portion.

One of such examples is a terminal wherein the stopper is formed by cutting the base of the intermediate part in substantially arched or semi-rectangular shape and by lifting the cut part along the foundation of the stopper located at the side of the barrel and whereby the fall preventing portion is contacted to said stopper by the side of the connecting portion.

A preferred embodiment is a terminal, wherein the fall preventing portion consists of a plate-like portion protruding substantially horizontally in linear shape from the upper end of one of the opposingly facing lateral walls of said intermediate part towards the other lateral wall thereof and being contacted thereto.

Also, the present invention provides a terminal for high-voltage resistant electrical wire wherein the stopper is formed by cutting the base of the intermediate part in substantially arched or semi-rectangular shape and by lifting the cut part along the foundation of the stopper located at the side of the barrel, wherein the fall preventing portion is contacted to said stopper by the side of the connecting portion and whereby the end section of the stopper is bent towards the connecting portion and engaged with the upper surface of the fall preventing portion.

A preferred embodiment is a terminal wherein the fall preventing portion comprises a pair of plate-like portions protruding respectively from the upper end of each of the opposingly facing lateral walls of said intermediate part towards the other lateral wall thereof, the outermost section of said portions being contacted with each other.

Further, the present invention provides a terminal for high-voltage resistant electrical wire, wherein the stopper is formed integrally with at least one of the plate-like portions and extends downwardly therefrom, said stopper further being inserted in a slit formed through the base of the intermediate part.

A preferred embodiment is a terminal wherein the fall preventing portion comprises a pair of plate-like portions protruding superposedly from the upper end of each of the opposingly facing lateral walls of the intermediate part towards the other lateral wall thereof, so that said plate-like portions form a bridge or arched shape, and whereby the stopper is formed integrally with the plate-like portion superposed on the upperside.

According to a first embodiment of the present invention, there is provided a fall preventing portion consisting of a plate-like portion, said plate-like portion protruding from the upper end of at least one of the opposing lateral walls of the intermediate part towards the other lateral wall and being in contact with the connecting portion side plane of the stopper. Thus the zone where the stopper is formed by cutting and lifting is reinforced by this fall preventing portion and solidity of the terminal is improved. Thus, even if an axial force is exerted on the stopper, the stopper will neither fall nor be broken.

According to another embodiment of the present invention, a pair of plate-like portions, which protrude respectively from the upper end of each of the opposing lateral walls of the intermediate part towards the other lateral wall thereof, form a fall preventing portion configured in the form of an arch or a bridge and the bent extremity of the stopper is in contact with the upper surface of the fall preventing portion. In this way, the zone where the stopper is formed by cutting and lifting is reinforced and solidity of the terminal is improved. The stopper is thus more reliably supported, such that, even under an axial force, fall or breakage is more efficiently prevented.

According to another embodiment of the present invention, a pair of plate-like portions, protruding respectively from the upper end of the opposing lateral walls of the intermediate part, form the fall down-preventive portion in a shape of an arch; or a bridge at least one of the plate-like portions protrudes towards the base; and the outermost section of said portion is inserted in a slit formed through the base, all these configurations constituting a stopper. Thus, not only is the stopper is prevented from falling or breaking, but also that due to the fact that the stopper is not formed by cutting and lifting of the base, solidity of the terminal is improved.

BRIEF DESCRIPTION OF THE DRAWINGS

The above and other objects, features and advantages of the invention will be apparent from the following description of the preferred embodiments, given as a non-limiting example, with reference to the accompanying drawings, in which.

DETAILED DESCRIPTION OF THE INVENTION

Figure 1:
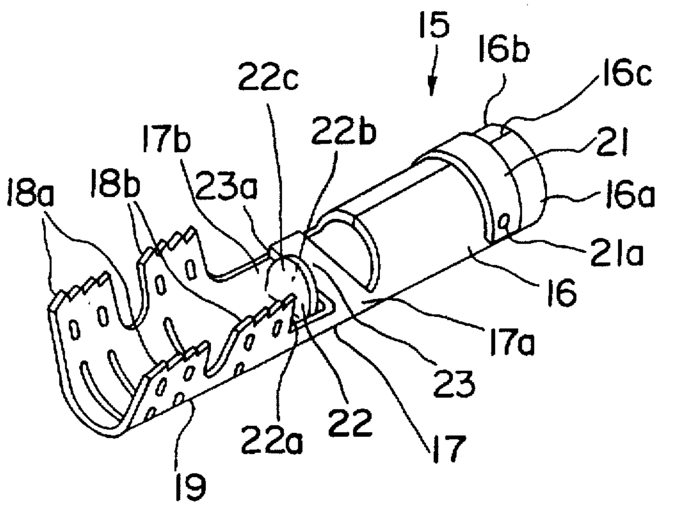
FIG. 1 is a perspective view of the first embodiment according to the present invention.
Figure 2:
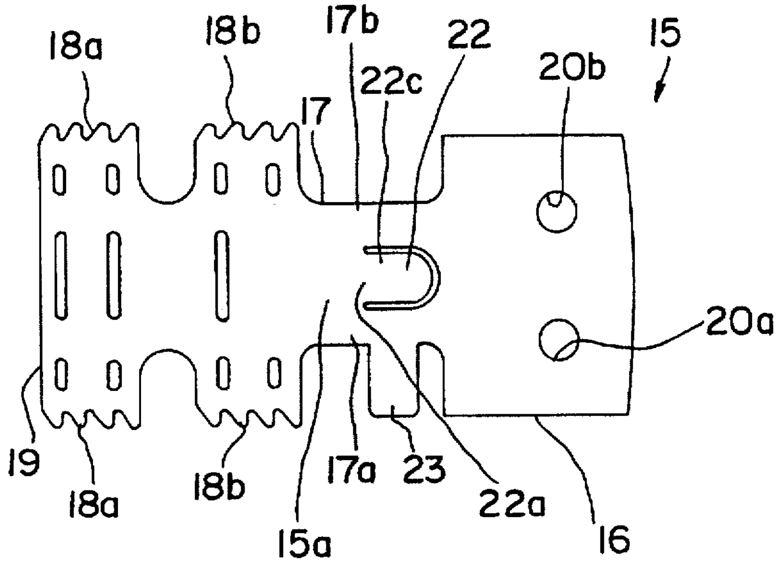
FIG. 2 is an exploded view of the first embodiment.
Figure 3:
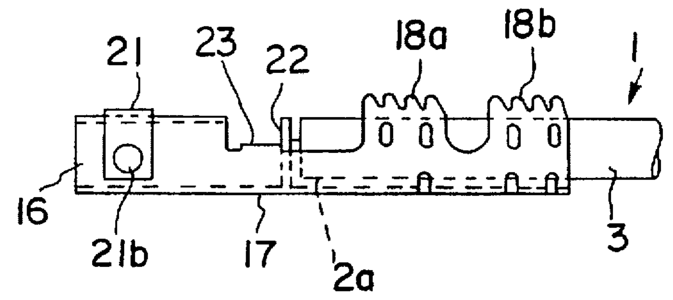
FIG. 3 is a side view of the first embodiment.

FIGS. 1 to 3 show the terminal for high-voltage resistant electrical wire according to a first embodiment of the present invention.

Terminal 15 has a substantially cylindrical form as shown in FIG. 1, formed by bending a sheet of metal plate shown in FIG. 2. The terminal 15 is made of a metal plate having excellent electrical conductivity and excellent elasticity being of such terminal materials as C 2600 and KLF-5, and the plate is thin. The terminal 15 comprises, from one end to the other of the base 15*a* contained in an axially-extending circular arc, a cylindrical connecting portion 16, an intermediate part 17 provided with facing lateral walls 17*a*, 17*b* with the distance of the base 15*a* therebetween, said part being open at the upper side thereof as shown in the figure, and a barrel 19 provided with two pairs of flanges 18*a*, 18*b*.

Said connecting portion 16 comprises opposingly facing circular arc portions 16*a*, 16*b* with the space of the base 15*a* put therebetween and the outermost section of the circular arc portions 16*a*, 16*b* are respectively contacted. Also, the connecting portion 16 is provided at its outer side with a pair of holes 20*a*, 20*b* facing each other.

On the outermost contacting zone of the connection portion 16, a clamp 21 in circular are shape is applied from exterior, so as to prevent a gap 16*c* from forming between said circular arc portions 16*a*, 16*b* . The clamp 21 is provided with protrusions 21*a*, 21*b* which fit into said holes 20*a*, 20*b*.

As is shown in FIGS. 1 and 2, said intermediate part 17 is provided with a cut portion in U-shape through the base 15*a* so that the foundation 22*a* of the U-shape is located at the side of the barrel 19 and this cut portion is bent substantially vertically with respect to the base 15*a*, so as to form the stopper 22.

Also, the intermediate part 17 is provided with a support 23 consisting of a rectangular plate-like portion, said plate-like portion protruding from the upper end of wall towards the end portion of the other lateral wall 17*b* and also transversing the opening of the intermediate part 17.

The end section 23*a* of said support 23 located at the side of the barrel 19 is so formed as to be set substantially up against foundation 22*a* of said stopper 22, whereby this end-section 23*a* is put into contact with the plane 22*b* of the stopper 22, facing side of the connecting portion 16. Plane 22*c* is on the opposite side of stopper 22.

As shown in FIGS. 1–3, the high-voltage resistant electrical wire 1 comprises an exposed conductor, said conductor being folded back at the cut-off end of the insulation coating 3 and extending along the exterior thereof, thereby forming fold-back portion 2*a*. This state, this fold-back portion is inserted into the barrel 19 of the terminal 15, such that the fold-back portion 2*a* extending along the end section of the insulation coating 3 is contacted with the stopper 22 at the plane 22*c* thereof located at the side of the barrel 19, and such that the fold-back portion 2*a* extending along the exterior of the insulation coating 3 is contacted with the base 15*a*.

As the end portion of high-voltage resistant electrical wire 1 is inserted in the terminal 15 as described above, the flanges 18a, 18b of the barrel 19 are then clamped, so that the high-voltage resistant electrical wire is caulked and adhesively pressed. This caulking sets the fold-back portion 2a of the conductor 2 pressed by the insulation coating 3, so as to be adhesively pressed on the base 15a of the terminal 15. Also the end section of the fold-back portion 2a is contacted with the stopper 22. This terminal 15 is made of a thin material for terminal having a good elasticity, so that the stopper 22 is elastically contacted with the end section of the fold-back portion 2a, conferring good contactability between the conductor 2 and the terminal 15.

In this terminal 15, the support 23 protruding from the lateral wall 17a towards the lateral wall 17b is formed at the position where the stopper 22 is formed by cutting and lifting, such that the cut and elevated zone is reinforced by the support 23 and whereby solidity of the terminal 15 is globally improved.

Also, even if an axial force is exerted from the adhesively pressed, high-voltage resistant electrical wire 1 towards the stopper 22, the stopper 22, being supported by the support 23, will neither collapse nor be broken at the foundation 22a. Thus electrical connection between the conductor 2 and the terminal 15 is maintained in good condition.

Figure 4A:
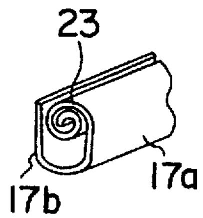
FIG. 4(A) to (G) are a partial perspective view of variants of the first embodiment.
Figure 4B:
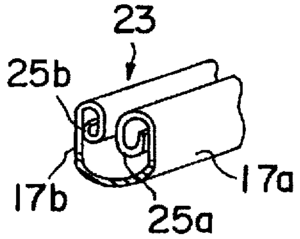
Figure 4C:
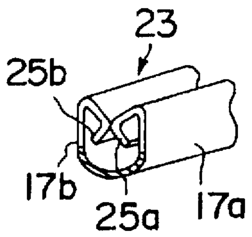
Figure 4D:
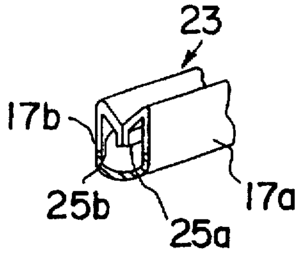
Figure 4E:
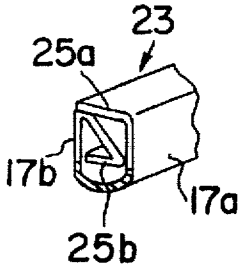
Figure 4F:
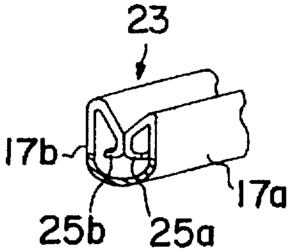
Figure 4G:
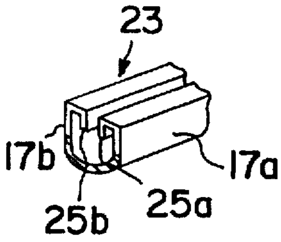

FIGS. 4(A) to (G) show variants of the first embodiment. FIG. 4(A) shows an example where the support 23 consisting of a plate-like portion protruding from one of the lateral walls 17a is formed in coiled state. FIG. 4(B) shows an example where ovally winding plate-like portions 25a, 25b, by sectional view, are protruding from both lateral walls 17a, 17b, constituting the support 23. FIG. 4(C) presents an example where triangularly bent plate-like portions 25a, 25b, by sectional view, are protruding from both of lateral walls 17a, 17b, constituting the support 23. FIG. 4(D) presents an example where plate-like portions 25a, 25b, protruding from both lateral walls 17a, 17b, are respectively bent in two steps towards the base 15a and where the plate-like portion 25a, 25b are respectively contacted, thus forming a fall preventing portion 23. FIG. 4(E) represents an example where the plate-like portion 25a protruding from one of the lateral walls 17a is projected towards the other lateral wall 17b as shown in the first embodiment, whilst the plate-like portion 25b protruding from the other lateral wall 17b is bent, as seen along a sectional view, in a triangular form. FIG. 4(F) shows an example where plate-like portions 25a, 25b protruding from both lateral walls 17a, 17b are respectively bent and contacted. FIG. 4(G) shows an example where plate-like portions 25a, 25b being bent in an inverted U-form by sectional view are protruding from both lateral walls 17a, 17b. Otherwise, the other structural parts of the terminal 15 shown in FIG. (A) to (G) are the same as in the first embodiment.

According to the variant examples shown in said FIG. 4(A) to (G), the stopper 22 is supported by a support 23, just as in the example of the first embodiment, so that the stopper 22, even under an axial force exerted thereon, is neither collapsed nor broken and can maintain a good connectivity. Also, the configuration of the support 23 reinforces the zone where the stopper 22 is formed by cutting and lifting, so that the terminal 15 is, as a whole, sufficiently reinforced.

Figure 5:
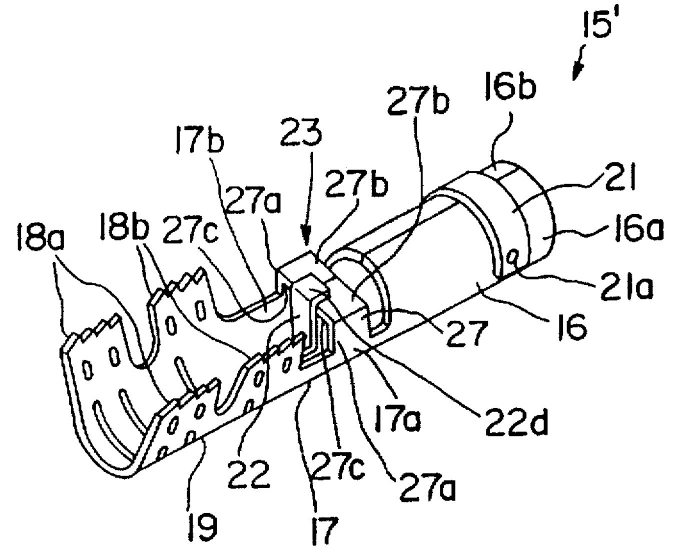
FIG. 5 is a perspective view of the second embodiment according to the present invention.

In the following, a second embodiment of the present invention is described with reference to FIG. 5 and FIG. 6.

Figure 6:
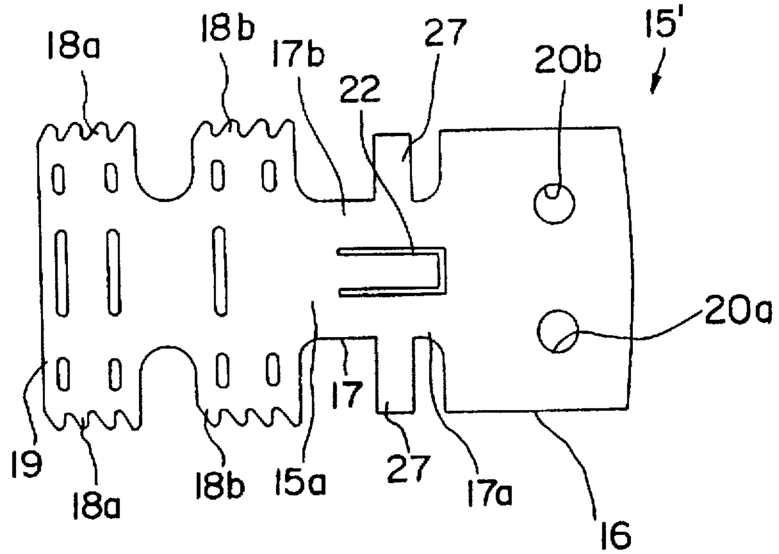
FIG. 6 is an exploded view of the second embodiment.

In the terminal 15', as is shown in FIG. 6, a rectangular cut is formed through the base 15a of the intermediate part 17 and a stopper 22 is formed by lifting this cut portion substantially vertically with respect to the base 15a.

Also, in this terminal 15', plate-like portions 27, 27, bent in L-form by sectional view, are protruding respectively from the opposing lateral walls 17a, 17b of the intermediate part 17. Each plate-like portion 27, 27 is provided with the first parts 27a, 27a protruding upwards in FIG. 5 and with the second parts 27b, 27b protruding horizontally in the same figure. The outermost section of the second part 27b, 27b are contacted with each other, so that the plate-like portions 27, 27 form a support 23 arched in a form of an inverted U.

The outermost part of said stopper 22 is bent substantially at a right angle towards the connecting portion 16, so that the outermost part 22d protruding horizontally is contacted with the second parts 27b, 27b of the plate-like portion 27, said second parts constituting the upper plane of said support 23.

According to the terminal 15' in the second embodiment, not only does the plane 22b of the stopper 22 facing towards the connecting portion 16 lean against the end sections 27c, 27c of the plate-like portions 27, 27 constituting the support 23 and facing towards the barrel 19 end portion 22d of the stopper 22 contacts the second part 27b, 27b of the plate-like portion 27, 27 constituting the support 23. For this reason, in this terminal 15', the stopper 22 is even more solidly supported by the fall preventing portion 23, so that the stopper 22 is more reliably prevented from falling and breaking. Further, the zone where the stopper 22 is formed by cutting and lifting is reinforced by said support 23 so that the terminal 15' is as a whole sufficiently reinforced. As for the other constructions of the second embodiment and their functions, they are the same as those of the first embodiment. Also, the same references are used for the same structures, and further explanation is therefore omitted.

Further, a third embodiment is described hereinafter with reference to FIG. 7 and FIG. 8. According to the first and the second embodiments, the stopper 22 is formed by cutting and lifting the base 15a, whereas, in the terminal 15" of the third embodiment, the stopper 22 is formed integrally with the plate-like portions 29.

Figure 7:
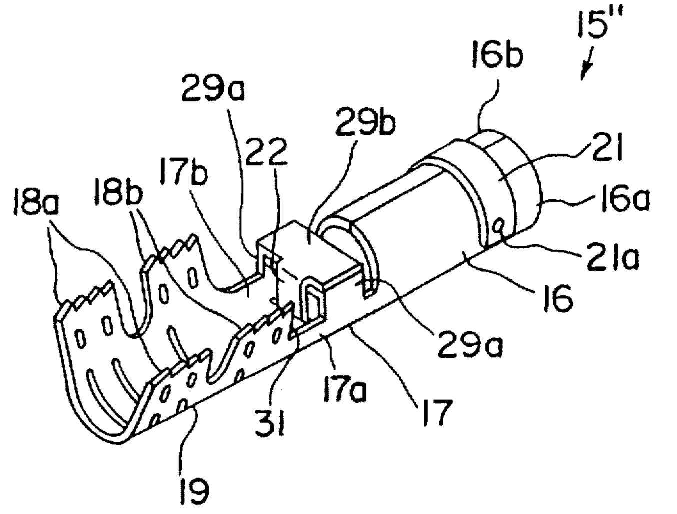
FIG. 7 is a perspective view of the third embodiment according to the present invention.
Figure 8:
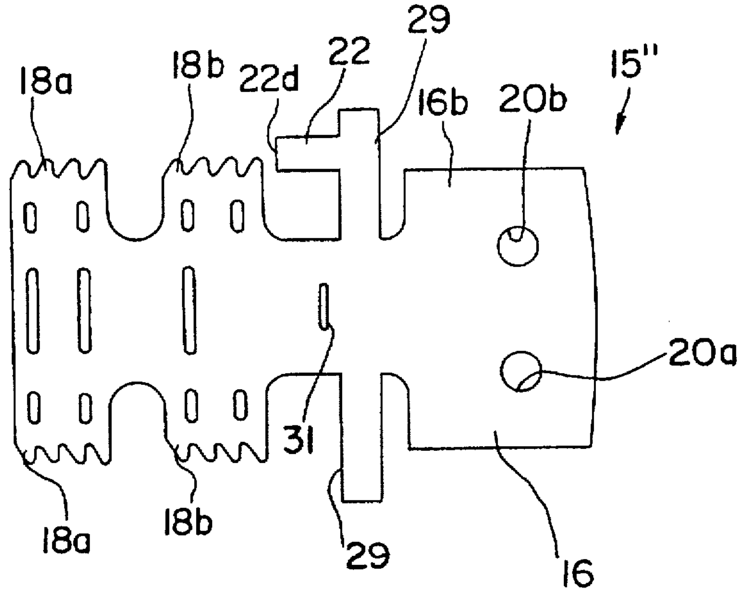
FIG. 8 is an exploded view of the third embodiment.

As shown in FIGS 7 and 8, in the terminal 15" of the third embodiment, plate-like portions 29, 29 in a form of L by sectional view, are protruding respectively from the upper ends of the opposing lateral walls 17a, 17b of the intermediate part 17. Each plate-like portion 29, 29 is provided with the first parts 29a, 29a protruding upwards and with the second parts 29b protruding horizontally and substantially at a right angle with respect to the first parts 29a, 29a. Also, the second part 29b of the plate-like portion 29 protruding from one of the lateral walls 17a is superposed to and contacted with the second part 29b of the plate-like portion 29 protruding from the other lateral wall 17b. In this way, in the case of the terminal 15", the plate-like portions 29, 29 constitute a support 23 in an arched form crossing the opening of the intermediate part 17.

Moreover, the second part 29b of the plate-like portion 29 protruding from the other lateral wall 17b is provided integrally with a rectangular plate-like portion protruding from the end section thereof facing the barrel 21 towards the base 15a, said portion forming a stopper 22.

Further, the base 15a is provided with a long and fine slit 31 in which is inserted the outermost section 22d of said stopper 22.

In the case of the third embodiment, the stopper 22 is integrally formed with a plate-like portion 29 at its one side and is inserted in a slit 31 by its other side, i.e. end portion 22d. This configuration avoids the collapse or breakage of the stopper even under an axial force and allows a good connectivity to be maintained.

In this third embodiment, the stopper 22 is not formed by cutting and lifting the base as described above, and is formed integrally with a support 23. In the intermediate part 17 the base contains a simple slit 31. Therefore the terminal has sufficient solidity and is not easily deformed by external force.

The other constructions and functions of the third embodiment are the same as those of the first embodiment. Also, the same references are used for the same structural parts, and further explanation is therefore omitted.

Figure 9A:
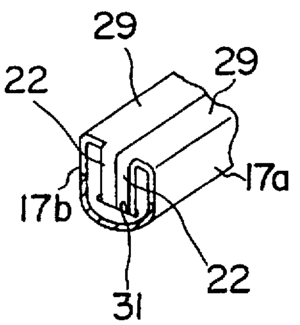
FIG. 9(A) to (D) are a partial perspective view of variants of the third embodiment.
Figure 9B:
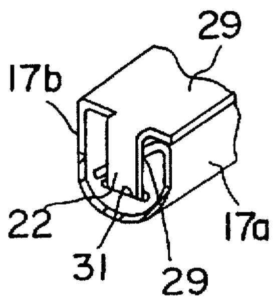
Figure 9C:
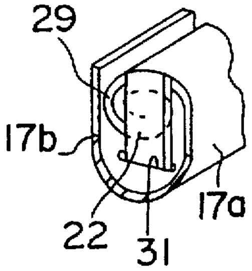
Figure 9D:
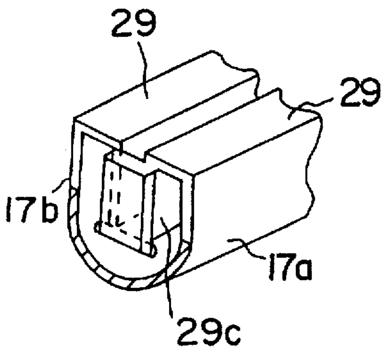
Figure 10:
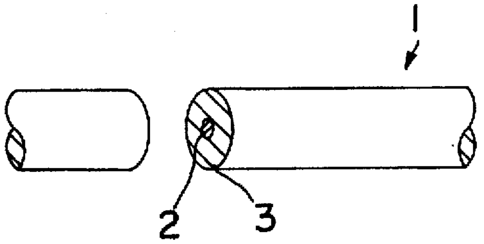
FIG. 10 PRIOR ART
FIG. 10 is a summary perspective view showing a high-voltage resistant electrical wire.
Figure 11:
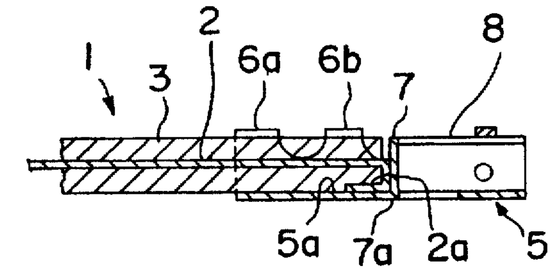
FIG. 11 PRIOR ART
FIG. 11 is a summary sectional view showing a known terminal.

FIG. 9(A) to (D) show variants of the third embodiment. FIG. 9(A) presents an example in which plate-like portions 29, 29 are protruding horizontally respectively from both lateral walls 17*a*, 17*b* and are connected reciprocally, whereupon downwardly protruding stoppers 22, 22 are provided at respective end planes of said plate-like portions on the side facing the barrel 19 and in which the outermost sections of the stoppers 22, 22 are inserted in a slit 31. FIG. 9(B) shows an example in which the plate-like portion 29 protruding from one of the lateral walls 17*a* is so bent in an acute angle as to protrude towards lower side of the other lateral wall 17*b*, whilst the upper side plate-like portion 29 protrudes horizontally from the other lateral wall 17*b*, said portion being integrally formed with the stopper 22, whereupon the outermost section of which stopper is inserted in a slit 31. FIG. 9(C) shows an example in which the plate-side portion 29 protruding from one of the lateral walls 17A is coiled, the upper side of said portion 29 being integrally formed with the stopper 22, then the outermost section of which stopper is inserted in a slit 31. In FIG. 9(D), the plate-like portions 29, 29 bent in an inverted U-form by sectional view, are provided at both lateral walls 17*a*, 17*b*. Also in this FIG. (D), the end portion 29*c* protruding downwardly from the plate-like portion 29 of one of the lateral walls 17*a* are so bent as to form a stopper 22, and whereby the outermost section of said stopper is inserted in a slit 31. Otherwise, the other structural parts in FIG. 9(A) to (D) are the same as those in the third embodiment.

The terminals according to FIG. 9(A) to (D) are, as in the third embodiment, so configured that the stopper 22 is integrally formed with the plate-like portion 29 which constitutes the preventive portion 23, and that the outermost section of the stopper 22 is inserted and leaned on in a slit 31 provided through the base 15*a*. Therefore, the stopper 22, even under an axial force, will neither collapse nor break down, so that a good connectivity is maintained with a high-voltage resistant electrical wire.

As is evident from the preceding explanation, the terminal for high-voltage resistant electrical wire according to the present invention is provided with plate-like portions protruding from the upper end of at least one of the lateral walls facing each other and located at the intermediate part, towards the other lateral wall, said portion being contacted with a stopper formed by cutting and lifting the base and thus constituting a support. This configuration prevents the stopper from collapsing or breaking, when an axial force is exerted thereon by a high-voltage resistant electrical wire, and permits maintenance of good connectivity between the high-voltage resistant electrical wire and the terminal. At the same time, as the zone where the stopper is formed by curing and lifting is reinforced by the support, the solidity of the terminal is improved.

Also, a pair of plate-like portions may be so configured as to protrude respectively from the upper ends of the lateral walls facing each other and located in the intermediate part, towards the other lateral wall, so that said portions constitute a support in an arched form. Said support may be contacted with the stopper formed by cutting and lifting the base and further the bent end portion of the stopper may be contacted with the upper surface of the support. This configuration permits to prevent more reliably the stopper from collapsing and breaking and at the same time the zone where the stopper is formed by cutting and lifting is reinforced by the support, so that solidity of the terminal is improved.

Furthermore, a stopper may be formed integrally with a support in an arched form, whilst the outermost section of the support is inserted in a slit formed through the base. In this way, a collapse or breakage of the stopper is prevented. At the same time, as the stopper is not formed by cutting and lifting, solidity of the terminal is improved.

As described above, for the purpose of the terminal for high-voltage resistant electrical wire according to the present invention, various thin easily formed materials having good elasticity electrical conductivity may be used and their formability is good. According to the invention, even if the terminal is formed with thin terminal material, the stopper can have a sufficiently large surface, due to the adequate reinforcement of the zone where the stopper is formed by cutting and elevating. Moreover the terminal of the high-voltage electrical wire does not jut out, so that burning damage is reliably prevented.

I claim:

1. A terminal for an electrically conductive wire comprising a conductor surrounded by an insulating coating, an end section of said wire including an exposed part of said conductor, said terminal comprising a barrel for securing said end section of said wire, a connecting portion adapted to receive an electrode, and an intermediate part between said barrel and said connecting portion, said intermediate part having a base and a first lateral wall and a second lateral wall extending therefrom, upper ends of said first lateral wall being opposed to and spaced apart from said second lateral wall, a stopper, upstanding from said base between said lateral walls, and in contact with said exposed part, said stopper having a barrel side, facing said barrel, and a connecting side, facing said connecting portion, a support between said lateral walls and in substantial contact with one of said barrel side and said connecting side and spaced apart from said base, thereby supporting said stopper, said stopper comprising a lifted cut portion of said base which is arched or semirectangular in shape, said cut portion extending from said base at its proximal portion and having its distal portion, remote from said proximal portion, bent toward said connecting portion and in engagement with said support.

2. The terminal of claim 1 wherein said support extends from said first wall to said second wall.

3. The terminal of claim 1 wherein said exposed part includes a folded back portion of said conductor.

4. The terminal of claim 1 wherein said stopper has a foundation which is integral with said base.

5. The terminal of claim 1 wherein said support is integral with said first wall or said second wall.

6. The terminal of claim 1 wherein said support, in section, is linear.

7. The terminal of claim 1 wherein said support is on said connecting side.

8. The terminal of claim 1 wherein said support is substantially parallel to said base and in contact with said first wall and said second wall.

9. The terminal of claim 1 wherein said support comprises a pair of planar portions, one extending from, and integral with, each of said first wall and said second wall, said planar portions in contact with each other at their outer ends.

10. The terminal of claim 1 wherein said support, in section, is bent.

11. The terminal of claim 1 wherein said support, in section, is coiled.

12. A terminal for an electrically conductive wire comprising a conductor surrounded by an insulating coating, an end section of said wire including an exposed part of said conductor, said terminal comprising a barrel for securing said end section of said wire, a connecting portion adapted to receive an electrode, and an intermediate part between said barrel and said connecting portion, said intermediate part having a base and a first lateral wall and a second lateral wall extending therefrom, upper ends of said first lateral wall being opposed to and spaced apart from said second lateral wall, a stopper, upstanding from said base between said lateral walls, and in contact with said exposed part, said stopper having a barrel side, facing said barrel, and a connecting side, facing said connecting portion, a support between said lateral walls and in substantial contact with one of said barrel side and said connecting side and spaced apart from said base, thereby supporting said stopper, said stopper integral with said support and extending downwardly therefrom, said base having a slit therein and an end of said stopper remote from said support in said slit.

13. The terminal of claim 12 wherein said support is a first planar portion and a second planar portion, one extending from, and integral with, each of said first wall and said second wall, said first planar portion superposed on said second planar portion.

14. The terminal of claim 13 wherein said stopper is integral with said first planar portion or said second planar portion.

* * * * *